US012674545B2

(12) United States Patent
Togasaki et al.

(10) Patent No.: US 12,674,545 B2
(45) Date of Patent: Jul. 7, 2026

(54) LUBRICATION SYSTEM

(71) Applicant: HONDA MOTOR CO., LTD., Tokyo (JP)

(72) Inventors: Motoshi Togasaki, Wako (JP); Daijiro Eto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/066,671

(22) Filed: Feb. 28, 2025

(65) Prior Publication Data

US 2025/0283576 A1 Sep. 11, 2025

(30) Foreign Application Priority Data

Mar. 6, 2024 (JP) ................................. 2024-033531

(51) Int. Cl.
| | |
|---|---|
| *F16N 29/02* | (2006.01) |
| *F16N 7/40* | (2006.01) |
| *B64D 33/00* | (2006.01) |

(52) U.S. Cl.
CPC .............. *F16N 29/02* (2013.01); *F16N 7/40* (2013.01); *B64D 33/00* (2013.01); *F16N 2200/10* (2013.01); *F16N 2210/08* (2013.01); *F16N 2250/04* (2013.01); *F16N 2250/08* (2013.01); *F16N 2270/70* (2013.01); *F16N 2280/00* (2013.01)

(58) Field of Classification Search
CPC ... F16N 7/38; F16N 7/40; F16N 29/02; F16N 2200/10; F16N 2200/12; F16N 2210/08
See application file for complete search history.

(56) References Cited

U.S. PATENT DOCUMENTS

| | | | | |
|---|---|---|---|---|
| 8,807,922 | B2 * | 8/2014 | Tietze ..................... | F03D 80/70 |
| | | | | 416/174 |
| 10,961,880 | B2 * | 3/2021 | Karcher ................... | F01M 1/02 |
| 2006/0054406 | A1 * | 3/2006 | Delaloye ................ | F01D 25/18 |
| | | | | 184/6.11 |
| 2008/0116010 | A1 * | 5/2008 | Portlock ................ | F01D 25/18 |
| | | | | 184/6.12 |
| 2013/0319798 | A1 * | 12/2013 | Sheridan ................. | F01D 25/20 |
| | | | | 184/6 |
| 2019/0316672 | A1 * | 10/2019 | Davies ................ | F16H 57/0479 |
| 2021/0254506 | A1 * | 8/2021 | Legare ..................... | F16N 7/38 |

FOREIGN PATENT DOCUMENTS

JP        11-153013  A        6/1999

* cited by examiner

*Primary Examiner* — Minh Truong
(74) *Attorney, Agent, or Firm* — Rankin, Hill & Clark LLP

(57) ABSTRACT

A lubrication system includes: a first pump capable of supplying oil drawn from the tank to the lubrication target; a second pump capable of discharging the oil drawn from the lubrication target to the tank; a relief valve capable of releasing the oil in the first flow path to the tank; a third pump capable of discharging the oil drawn through the intake opening to the tank, a switching valve capable of selectively switching a connection destination of the intake opening to either the lubrication target or the tank; and a valve control unit for switching the connection destination of the intake opening by controlling the switching valve.

8 Claims, 5 Drawing Sheets

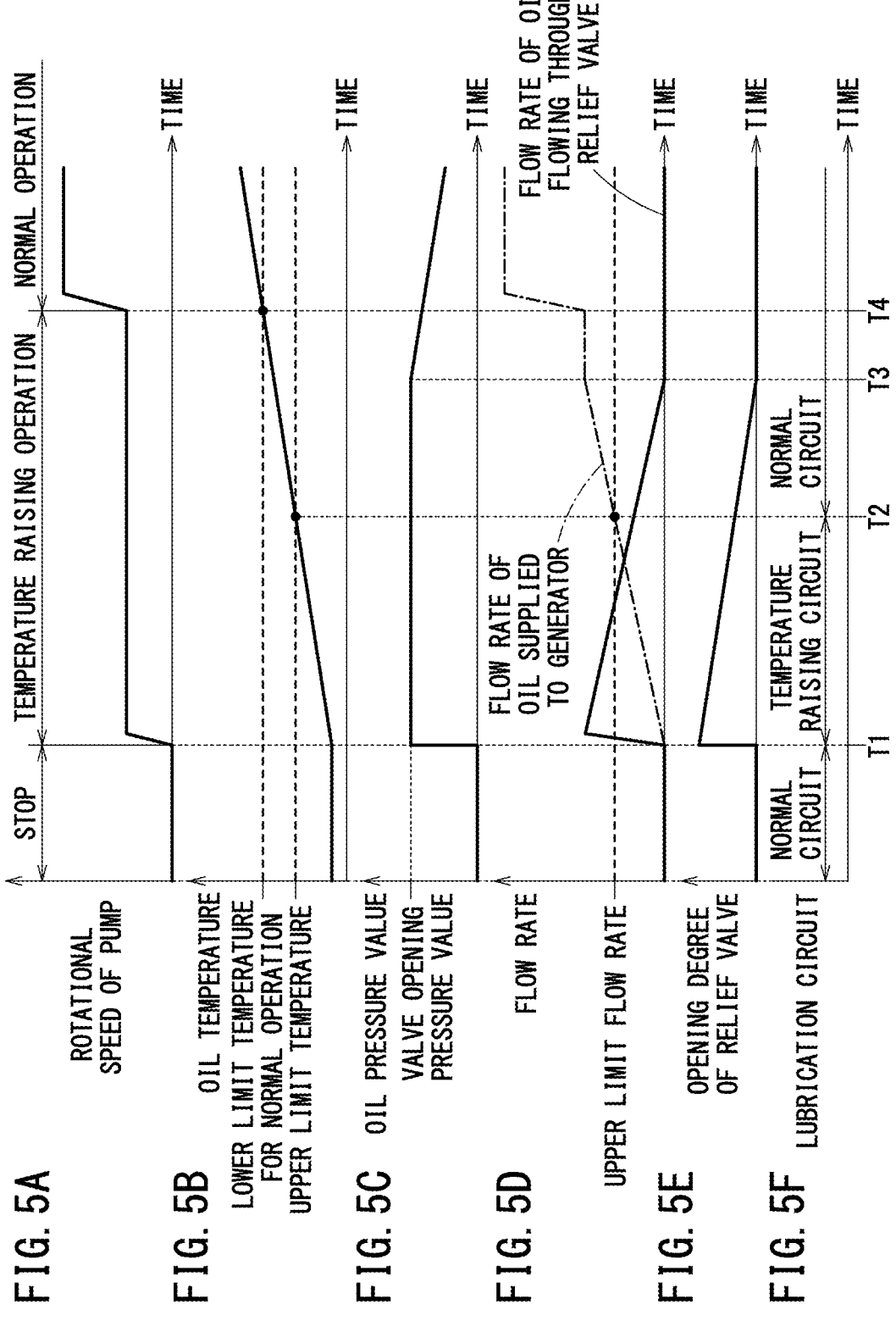

LUBRICATION SYSTEM

CROSS-REFERENCE TO RELATED APPLICATIONS

This application is based upon and claims the benefit of priority from Japanese Patent Application No. 2024-033531 filed on Mar. 6, 2024, the contents of which are incorporated herein by reference.

BACKGROUND OF THE INVENTION

Field of the Invention

The present disclosure relates to a lubrication system.

Description of the Related Art

In recent years, in order to ensure that more people can have access to affordable, reliable, sustainable, and advanced energy, research and development is being carried out in relation to electrification technologies that contribute to energy efficiency.

JP H11-153013 A discloses a lubricating device for a vehicular internal combustion engine. The lubricating device takes up lubrication oil from an oil pan by a pump and supplies the oil to a part that needs to be lubricated (bearings of a crankshaft of the internal combustion engine, and the like).

SUMMARY OF THE INVENTION

It is desired to smoothly supply oil to a target object, such as an electric machine, to be lubricated by oil.

The present invention has the object of solving the aforementioned problem.

An aspect of the present disclosure is to provide a lubrication system including: a first pump configured to draw oil from a tank and supply the oil to a lubrication target to be lubricated by the oil; a second pump configured to draw the oil from the lubrication target and discharge the oil to the tank; a relief valve configured to release the oil to the tank from a first flow path between the first pump and the lubrication target via a second flow path different from the first flow path in a case that a pressure value of the oil in the first flow path becomes equal to or higher than a predetermined value; a third pump configured to discharge the oil drawn via an intake opening to the tank; a switching valve configured to selectively switch a connection destination of the intake opening between the lubrication target and the tank; and a valve control unit configured to control the switching valve to switch the connection destination of the intake opening of the third pump.

According to the present invention, oil can be smoothly supplied to a target object to be lubricated by the oil.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5A is a timing chart showing the rotational speed of each pump (rotational speed of the gas turbine engine);
FIG. 5B is a timing chart showing the temperature of oil detected by a temperature sensor;
FIG. 5C is a timing chart showing the pressure of oil detected by a pressures sensor;
FIG. 5D is a timing chart showing the flow rate of oil supplied to a generator and the flow rate of oil flowing through a relief valve;
FIG. 5E is a timing chart showing the opening degree of the relief valve;
and
FIG. 5F is a timing chart showing whether the lubrication circuit functions as a temperature raising circuit or a normal circuit.

DETAILED DESCRIPTION OF THE INVENTION

The lubrication system lubricates a lubrication target with oil supplied thereto. The lubrication system may be provided in a various devices. In this specification, a lubrication system mounted on a flying object will be described.

Generally, at the start of operation of the lubrication system, oil is low in temperature and high in viscosity. Such oil is less likely to flow. However, the lubrication system to be described in the present specification can quickly raise the temperature of oil after the start of operation, and the oil is likely to start to flow soon.

1. Flying Object 10

Figure 1:
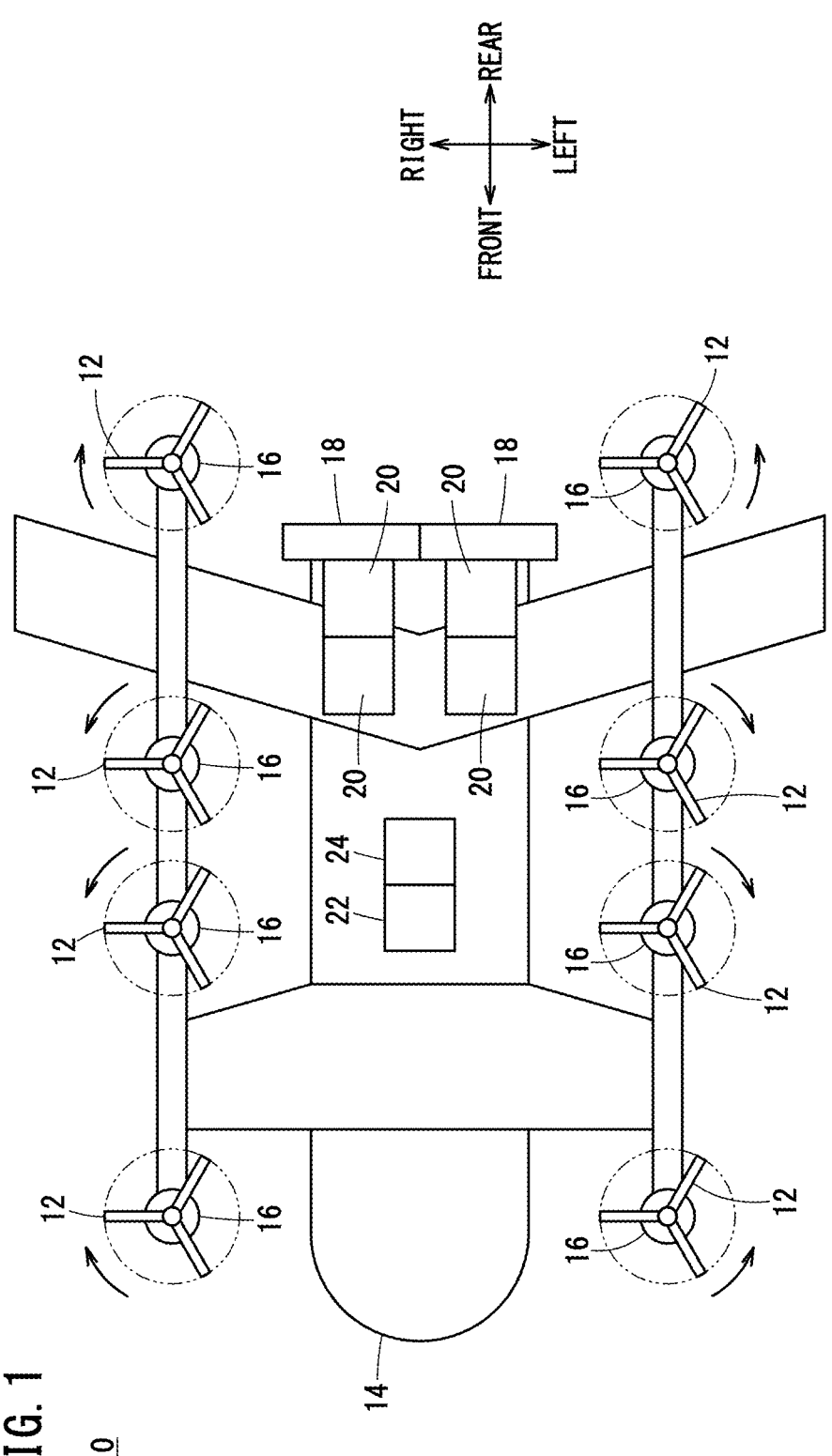
FIG. 1 is a schematic view of a flying object.

FIG. 1 is a schematic view of a flying object 10. The flying object 10 is an electric vertical take-off and landing (eV-TOL) aircraft. The flying object 10 is equipped with eight VTOL rotors 12. The VTOL rotors 12 generate an upwardly directed thrust with respect to the airframe 14. The flying object 10 is equipped with eight electric motors 16. One of the electric motors 16 drives one of the VTOL rotors 12. The flying object 10 includes two cruise rotors 18. The cruise rotors 18 generate a forwardly directed thrust with respect to the airframe 14. The flying object 10 is equipped with four electric motors 20. Two of the electric motors 20 drive one of the cruise rotors 18.

The flying object 10 is equipped with a gas turbine engine (internal combustion engine) 22 and a generator 24. The gas turbine engine 22 drives the generator 24. The generator 24 generates electrical power. The electrical power generated by the generator 24 is supplied to load devices (electric motors 16, the electric motors 20, and the like) and to a power storage device (not shown) provided in the flying object 10. The gas turbine engine 22 and the generator 24 are included in a lubrication system 30 shown in FIG. 2.

2. Configuration of Lubrication System 30

Figure 2:
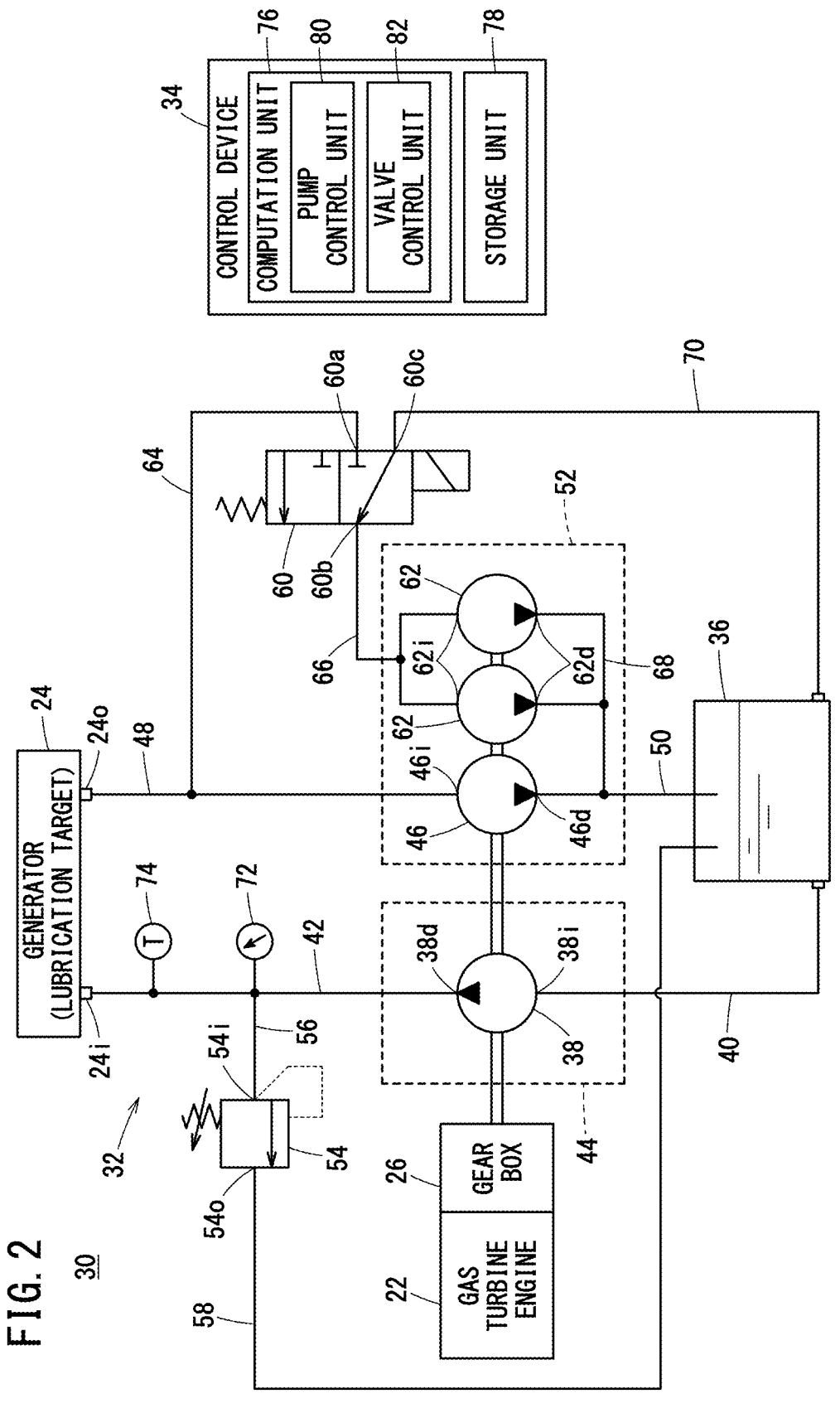
FIG. 2 is a schematic diagram of a lubrication system.

FIG. 2 is a schematic diagram of a lubrication system 30. In the lubrication system 30 of the present embodiment, the target object to be lubricated by oil is the generator 24 mounted on the flying object 10. The target object to be lubricated by oil is not limited to the generator 24. The lubrication system 30 includes a lubrication circuit 32 and a control device 34.

The lubrication circuit 32 includes the generator 24 and a tank 36. The generator 24 comprises an oil inlet 24*i* and an oil outlet 24*o*. The oil flows into the generator 24 from the oil inlet 24*i* and flows out of the generator 24 from the oil outlet 24*o*. The oil circulates between the tank 36 and the generator 24.

The lubrication circuit 32 also includes a first pump 38, a flow path 40, and another flow path (first flow path) 42. The first pump 38 includes an intake opening 38*i* and a discharge opening 38*d*. The intake opening 38*i* is connected to the tank 36 via the flow path 40. The discharge opening 38*d* is connected to the oil inlet 24*i* of the generator 24 via the flow path 42. The first pump 38 can draw oil from the tank 36 via the flow path 40 and supply the oil to the generator 24 via the flow path 42. The first pump 38 is a feed pump 44.

The lubrication circuit 32 includes a second pump 46, a flow path 48, and another flow path 50. The second pump 46 includes an intake opening 46*i* and a discharge opening 46*d*. The intake opening 46*i* is connected to the oil outlet 24*o* of the generator 24 via the flow path 48. The discharge opening 46*d* is connected to the tank 36 via the flow path 50. The second pump 46 can recover (draw) oil from the generator 24 via the flow path 48 and discharge the oil to the tank 36 via the flow path 50. The second pump 46 is included in a scavenging pump group 52.

The lubrication circuit 32 includes a relief valve 54, a flow path 56, and another flow path (second flow path) 58. The relief valve 54 includes an inlet 54*i* and an outlet 54*o*. The inlet 54*i* is connected to the flow path 42 via the flow path 56. The outlet 54*o* is connected to the tank 36 via the flow path 58. The outlet 54*o* may be connected to the flow path 40 via the flow path 58. The relief valve 54 opens when the pressure value of the oil on the primary side (in the flow path 56 and the flow path 42) becomes equal to or greater than a predetermined valve-opening pressure value (predetermined value). The relief valve 54 communicates the flow path 56 and the flow path 58 (the tank 36) in the open state. The relief valve 54 can release the oil in the flow path 42 to the tank 36 via the flow path 58.

The lubrication circuit 32 includes a switching valve 60, one or more third pumps 62, and flow paths 64, 66, 68, 70. The switching valve 60 includes a first opening 60*a*, a second opening 60*b*, and a third opening 60*c*. The switching valve 60 is a solenoid valve and is a two-position, directional control valve. While the switching valve 60 is in a non-energized (demagnetized) state, the first opening 60*a* and the second opening 60*b* communicate with each other. While the switching valve 60 is in an energized (excited) state, the third opening 60*c* and the second opening 60*b* communicate with each other. The first opening 60*a* is connected to the flow path 48 via the flow path 64. The second opening 60*b* is connected to an intake opening 62*i* of the third pumps 62 via the flow path 66. The third opening 60*c* is connected to the tank 36 via the flow path 70. The switching valve 60 can selectively switch the connection destination of the intake opening 62*i* of the one or more third pumps 62 between the generator 24 and the tank 36.

The third opening 60*c* and the second opening 60*b* may be in communication with each other while the switching valve 60 is in the non-energized (demagnetized) state, and the first opening 60*a* and the second opening 60*b* may be in communication with each other while the switching valve 60 is in the energized (excited) state. Further, as the switching valve 60, another valve (for example, a three-way valve) may be used instead of the two-position, directional control valve.

The one or more third pumps 62 include an intake opening 62*i* and a discharge opening 62*d*. The intake opening 62*i* is connected to the second opening 60*b* of the switching valve 60 via the flow path 66. The discharge opening 62*d* is connected to the tank 36 via the flow path 68. The third pump 62 can discharge the oil drawn through the intake opening 62*i* to the tank 36 through the flow path 68 and the flow path 50. The one or more third pumps 62 are included in the scavenging pump group 52, similarly to the second pump 46.

As shown in FIG. 2, the lubrication circuit 32 of the present embodiment is provided with two third pumps 62, but may be provided with one third pump 62 or three or more third pumps 62.

The oil flowing out of the generator 24 contains gas. Therefore, the capacity of the scavenging pump group 52 that recovers oil from the generator 24 is preferably larger than the capacity of the feed pump 44 that supplies oil to the generator 24. The lubrication circuit 32 of the present embodiment includes a plurality of scavenging pumps in the scavenging pump group 52 (the second pump 46 and one or more third pumps 62). Therefore, the capacity of each scavenging pump in the scavenging pump group 52 may not be larger than the capacity of the feed pump 44 (first pump 38). For example, by configuring the first pump 38, the second pump 46, and the third pump 62 with the same type of pump, it is possible to suppress the manufacturing cost and the maintenance cost of the lubrication system 30.

The rotation shaft of each of the first pump 38, the second pump 46, and the one or more third pumps 62 is connected to the rotation shaft of the gas turbine engine 22 via a gearbox 26. Driving the first pump 38, the second pump 46, and the one or more third pumps 62 by the same shaft as in the present embodiment can make the lubrication circuit 32 compact.

The lubrication circuit 32 includes a pressure sensor (pressure detection unit) 72 and a temperature sensor (temperature detection unit) 74. The pressure sensor 72 detects a pressure value of the oil in the flow path 42. The temperature sensor 74 detects the temperature of the oil in the flow path 42.

The control device 34 includes a computation unit 76 and a storage unit 78. The control device 34 is configured, for example, as an ECU (Electronic Control Unit).

The computation unit 76 can be constituted by a processor such as a CPU (Central Processing Unit), a GPU (Graphics Processing Unit), or the like. More specifically, the computation unit 76 can be configured by a processing circuit (processing circuitry). At least a portion of the computation unit 76 may be realized by an integrated circuit such as an ASIC (Application Specific Integrated Circuit), an FPGA (Field-Programmable Gate Array), or the like. Further, at least a portion of the computation unit 76 may be constituted by an electronic circuit including a discrete device.

The computation unit 76 includes a pump control unit 80 and a valve control unit 82. The pump control unit 80 and the valve control unit 82 can be realized by the computation unit 76 executing programs which are stored in the storage unit 78. The pump control unit 80 controls the rotational speed of each pump. For example, the pump control unit 80 may change the gear ratio of the gearbox 26 or may control the gas turbine engine 22. The valve control unit 82 controls the switching valve 60 based on the pressure detected by the pressure sensor 72 and the temperature detected by the temperature sensor 74. For example, the valve control unit 82 switches the connection destination of the intake opening 62*i* of the one or more third pumps 62 by switching the switching valve 60 between the energized state and the non-energized state.

The storage unit 78 is a computer-readable storage medium. The storage unit 78 is formed of a non-illustrated volatile memory and a non-illustrated nonvolatile memory. Examples of the volatile memory include, for example, a RAM (Random Access Memory) or the like. As the non-volatile memory, there may be cited, for example, a ROM (Read Only Memory), a flash memory, or the like. Data and the like are stored, for example, in the volatile memory. A program, a table, a map and the like are stored, for example, in the non-volatile memory. At least a portion of the storage unit 78 may be provided in the above-described processor, the integrated circuit, or the like.

3. Operation of Lubrication System 30

The lubrication circuit 32 supplies oil to the generator 24 and recovers oil from the generator 24 to lubricate the generator 24. The operation of the lubrication circuit 32 to lubricate the generator 24 is referred to herein as a lubrication operation. The lubrication operation is performed while the generator 24 is rotating (while the gas turbine engine 22 is rotating).

At the beginning of the lubrication operation, the oil is low in temperature and high in viscosity. In the case where the viscosity of the oil is high, the pressure loss of the oil in the generator 24 increases, and the pressure in the flow path 42 increases. Even if the rotational speed of each pump is increased in this state, the oil does not smoothly flow through the lubrication circuit 32. Therefore, the lubrication system 30 performs an operation of raising the temperature of the oil while driving each pump at a rotational speed lower than a normal rotational speed until the temperature of the oil exceeds a predetermined threshold temperature. In this specification, this operation is referred to as a temperature raising operation. The lubrication system 30 performs an operation of supplying sufficient oil to the generator 24 by rotating each pump at a normal rotational speed after the temperature of the oil exceeds a predetermined threshold temperature. In this specification, this operation is referred to as normal operation. In the present specification, the predetermined threshold temperature, which is the temperature at the time of switching from the temperature raising operation to the normal operation, is referred to as a lower limit temperature for the normal operation.

When the pressure value in the flow path 42 becomes equal to or higher than the valve opening pressure value of the relief valve 54, the relief valve 54 opens. In this manner, at the beginning of the lubrication operation, a part of the oil discharged to the flow path 42 from the first pump 38 flows through the flow path 56, the relief valve 54, and the flow path 58, and returns to the tank 36. Therefore, the amount of oil supplied to the generator 24 is small, and the amount of oil flowing out from the generator 24 is also small.

In this state, the flow rate of the oil flowing out from the generator 24 is lower than the upper limit of the flow rate of the oil that can be recovered by the second pump 46. In this state, the second pump 46 can recover the oil flowing out from the generator 24. On the other hand, as long as the second pump 46 is operating in this state, the third pump 62 is not required for recovery of the oil flowing out from the generator 24.

While a pump is in operation, the energy that the pump receives to operate is partially converted to heat. Therefore, the oil drawn by the pump is heated by the pump. The temperature of the oil is increased by continuously drawing and discharging the oil by the pump. In the lubrication circuit 32, the pump functions as a heat source. By supplying a large amount of oil to the pump, the temperature of the oil can be quickly raised. However, in the case where the amount of oil flowing out from the generator 24 is small, only a small amount of oil is supplied to the scavenging pump group 52 (the second pump 46 and the one or more third pumps 62).

Therefore, in the present embodiment, in the case that the amount of oil flowing out from the generator 24 is small, the third pump 62 is not used as a pump for recovering oil from the generator 24, but is used as a pump dedicated to raising the temperature of the oil in the tank 36. In this case, the valve control unit 82 controls the switching valve 60 to cause the third opening 60c and the second opening 60b to communicate with each other. Then, the intake opening 62i of the one or more third pumps 62 communicates with the tank 36 via the flow path 66, the switching valve 60, and the flow path 70. Thus, the third pump 62 draws oil from the tank 36 via the flow path 66, the switching valve 60, and the flow path 70. The oil drawn into the one or more third pumps 62 is heated by the one or more third pumps 62 and the temperature of the oil rises.

As the temperature of the oil rises, the flow rate of the oil flowing through the generator 24 increases. In the case where the temperature of the oil rises to some extent, the flow rate of the oil flowing out from the generator 24 exceeds the flow rate of the oil that can be recovered by the second pump 46. At this time, the valve control unit 82 controls the switching valve 60 to communicate the first opening 60a and the second opening 60b with each other. Then, the intake opening 62i of the one or more third pumps 62 communicates with the oil outlet 240 of the generator 24 via the flow path 66, the switching valve 60, the flow path 64, and the flow path 48. Thus, the one or more third pumps 62 recover (draw) oil from the generator 24 via the flow path 66, the switching valve 60, the flow path 64, and the flow path 48. The oil recovered by the one or more third pumps 62 is heated and increased in temperature by the one or more third pumps 62.

As described above, the valve control unit 82 controls the switching valve 60 so as to effectively utilize the scavenging pump group 52 (the second pump 46 and the one or more third pumps 62) in accordance with the state of the lubrication circuit 32. The valve control unit 82 controls the switching valve 60 so that the third opening 60c and the second opening 60b communicate with each other during a certain period at the beginning of the lubrication operation. Thus, the flow path 70 and the flow path 66 communicate with each other. In the present specification, the lubrication circuit 32 in which the flow path 70 and the flow path 66 communicate with each other is referred to as a temperature raising circuit. The valve control unit 82 controls the switching valve 60 such that the first opening 60a and the second opening 60b communicate with each other after the certain period described above ends. Thus, the flow path 64 and the flow path 66 communicate with each other. In the present specification, the lubrication circuit 32 in which the flow path 64 and the flow path 66 communicate with each other is referred to as a normal circuit.

4. Circuit Determination Process

Figure 3:
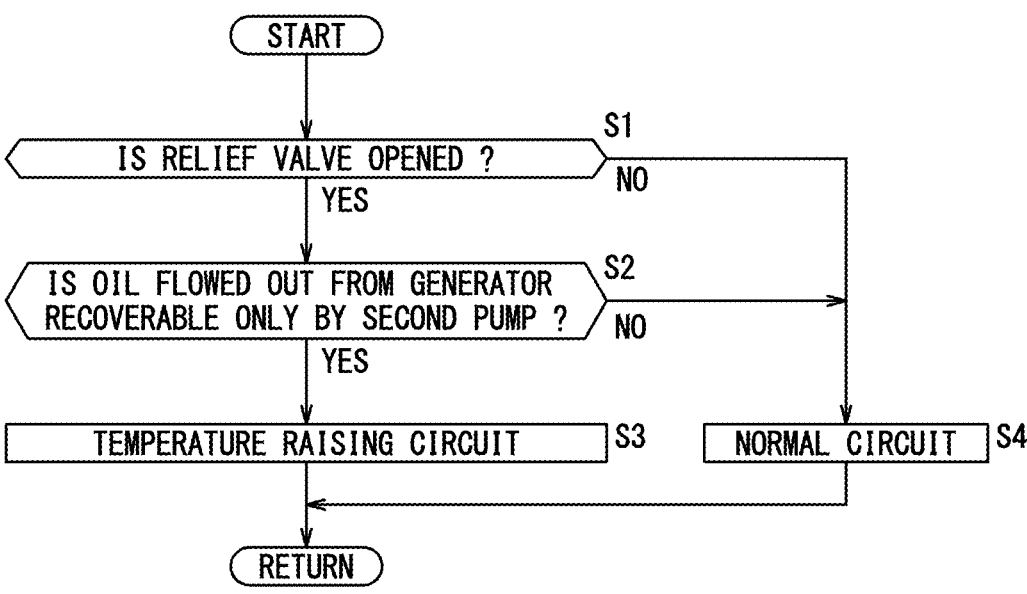
FIG. 3 is a flowchart of a circuit determination process.

FIG. 3 is a flowchart of a circuit determination process. The circuit determination process is a process in which the valve control unit 82 selects one of the temperature raising circuit and the normal circuit. When the gas turbine engine 22 is started, the first pump 38, the second pump 46, and the one or more third pumps 62 are also started. Thus, the lubrication operation is started. During the lubrication operation, the valve control unit 82 performs a circuit determination process described below at predetermined time intervals.

In step S1, the valve control unit 82 determines whether or not the relief valve 54 is opened. The valve control unit 82 determines that the relief valve 54 is opened when the pressure value detected by the pressure sensor 72 is equal to or higher than the valve opening pressure value of the relief valve 54. On the other hand, the valve control unit 82 determines that the relief valve 54 is not opened when the pressure value detected by the pressure sensor 72 is less than the valve opening pressure value of the relief valve 54. The valve opening pressure value of the relief valve 54 is stored in the storage unit 78 in advance. In the case that the relief valve 54 is opened (step S1: YES), the process transitions to step S2. On the other hand, in the case that the relief valve 54 is not opened (step S1: NO), the process proceeds to step S4.

Upon transitioning from step S1 to step S2, the valve control unit 82 determines whether the oil flowing out from the generator 24 can be recovered only by the second pump 46. Specifically, if the flow rate of the oil flowing out from the generator 24 is equal to or less than the flow rate of the oil recoverable only by the second pump 46, then the valve control unit 82 determines that all the oil flowing out from the generator 24 can be recovered only by the second pump 46. On the other hand, the valve control unit 82 determines that the recovery of all the oil flowing out from the generator 24 cannot be covered by the second pump 46 alone if the flow rate of the oil flowing out from the generator 24 exceeds the maximum possible flow rate of the oil that can be recovered by the second pump 46. The determination in step S2 will be described below.

In a state where the relief valve 54 is opened, the pressure value of the oil flowing through the lubrication circuit 32 is a constant value (valve opening pressure value of the relief valve 54). In this state, the flow rate of the oil flowing out from the generator 24 depends on the temperature of the oil. On the other hand, the flow rate of the oil that can be recovered by the second pump 46 depends on the rotational speed of the second pump 46. Here, the characteristics shown in FIG. 4 are established by replacing the flow rate of the oil flowing out from the generator 24 with the temperature of the oil and replacing the maximum possible flow rate of the oil that is recoverable by the second pump 46 with the rotational speed of the second pump 46.

Figure 4:
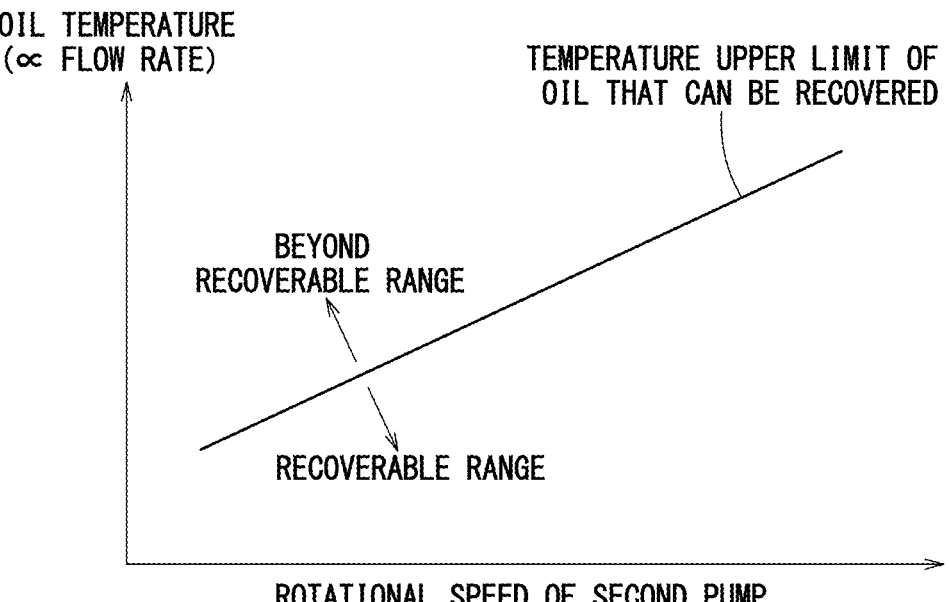
FIG. 4 is a diagram showing an upper limit temperature of oil that can be recovered by a second pump.

The characteristics shown in FIG. 4 indicate the upper limit temperature of the oil that can be recovered by the second pump 46. The upper limit temperature correlates with the maximum possible flow rate of the oil that is recoverable by the second pump 46. As shown in FIG. 4, the upper limit temperature increases as the rotational speed increases. The characteristics shown in FIG. 4 can be obtained by actually performing the lubrication operation. For example, the characteristics shown in FIG. 4 can be acquired by actually measuring the flow rate of the oil that can be recovered by the second pump 46 and the temperature of the oil for each rotational speed of the second pump 46. The characteristics shown in FIG. 4 are stored in the storage unit 78 in advance. The valve control unit 82 determines whether or not the oil flowing out from the generator 24 can be recovered only by the second pump 46 based on the characteristics and the temperature detected by the temperature sensor 74.

In the case that the temperature detected by the temperature sensor 74 is equal to or lower than the upper limit temperature determined according to the rotational speed of the second pump 46, the valve control unit 82 determines that the oil flowing out of the generator 24 can be recovered only by the second pump 46. On the other hand, in the case that the temperature detected by the temperature sensor 74 exceeds the upper limit temperature determined in accordance with the rotational speed of the second pump 46, the valve control unit 82 determines that the oil flowing out from the generator 24 is too much to be recovered only by the second pump 46.

In the case that the oil flowing out of the generator 24 can be recovered only by the second pump 46 (step S2: YES), the process transitions to step S3. On the other hand, in the case that the oil flowing out of the generator 24 beyond the amount that can be recovered only by the second pump 46 (step S2: NO), the process transitions to step S4.

Upon transitioning from step S2 to step S3, the valve control unit 82 selects the temperature raising circuit. The valve control unit 82 controls a valve drive circuit (not shown) so that the switching valve 60 is in an energized (excited) state. Then, the switching valve 60 is put in an energized (excited) state, and the third opening 60*c* and the second opening 60*b* communicate with each other. The intake opening 62*i* of the one or more third pumps 62 communicates with the tank 36. As a result, the lubrication circuit 32 functions as a temperature raising circuit.

In the temperature raising circuit, the second pump 46 recovers (draws) the oil flowing out of the generator 24 via the flow path 48, and discharges the recovered oil to the tank 36 via the flow path 50. On the other hand, the third pump 62 draws oil from the tank 36 via the flow path 70, the switching valve 60, and the flow path 66, and discharges the drawn oil to the tank 36 via the flow path 68 and the flow path 50.

Upon transitioning from to step S1 or from step S2 to step S4, the valve control unit 82 selects the normal circuit. The valve control unit 82 controls a valve drive circuit (not shown) so that the switching valve 60 is put in a non-energized (demagnetized) state. Then, the switching valve 60 is de-energized (demagnetized), and the first opening 60*a* and the second opening 60*b* communicate with each other. The intake opening 62*i* of the one or more third pumps 62 communicates with the oil outlet 240 of the generator 24. As a result, the lubrication circuit 32 functions as a normal circuit.

In the normal circuit, the second pump 46 recovers (draws) the oil flowing out from the generator 24 via the flow path 48, and discharges the recovered oil to the tank 36 via the flow path 50. On the other hand, the one or more third pumps 62 also recover (draw) the oil flowing out from the generator 24 via the flow path 48, the flow path 64, the switching valve 60, and the flow path 66, and discharge the recovered oil to the tank 36 via the flow path 68 and the flow path 50.

5. Timing Chart of Lubrication Operation

FIG. 5A is a timing chart showing the rotational speed of each pump (rotational speed of the gas turbine engine 22). FIG. 5B is a timing chart showing the temperature of oil detected by a temperature sensor 74. FIG. 5C is a timing chart showing the pressure of oil detected by a pressures sensor 72. FIG. 5D is a timing chart showing the flow rate of oil supplied to the generator 24 and the flow rate of oil flowing through the relief valve 54. FIG. 5E is a timing chart showing the opening degree of the relief valve 54. FIG. 5F is a timing chart showing whether the lubrication circuit 32 functions as a temperature raising circuit or a normal circuit.

At time T1, the gas turbine engine 22 is turned on. As shown in FIG. 5A, the pump control unit 80 starts the first pump 38, the second pump 46, and the one or more third pumps 62 in the low rotational speed range. Thus, the temperature raising operation is started. Then, as shown in FIG. 5C, the pressure in the flow path 42 is rapidly increased. As a result, the relief valve 54 opens as shown in FIG. 5E, and the oil starts to flow through the relief valve 54 as shown in FIG. 5D. As shown in FIG. 5F, the valve control unit 82 causes the lubrication circuit 32 to function as the temperature raising circuit. That is, the valve control unit 82 causes the third opening 60c and the second opening 60b of the switching valve 60 to communicate with each other.

As shown in FIG. 5B, the temperature of the oil gradually rises as the oil circulates through the temperature raising circuit. As the temperature of the oil rises, the viscosity of the oil gradually decreases, and the pressure loss in the generator 24 gradually decreases. Then, as shown in FIG. 5E, the opening degree of the relief valve 54 gradually narrows. As a result, as shown in FIG. 5D, the flow rate of the oil supplied to the generator 24 gradually increases, and the flow rate of the oil flowing through the relief valve 54 gradually decreases.

As shown in FIG. 5D, at time T2, the flow rate of the oil supplied to the generator 24 exceeds the maximum flow rate of the oil that can be recovered only by the second pump 46. As shown in FIG. 5B, the temperature of the oil exceeds the upper limit temperature of the oil corresponding to the maximum possible flow rate of the oil that is recoverable by the second pump 46. As shown in FIG. 5F, at this timing, the valve control unit 82 causes the lubrication circuit 32 to function as a normal circuit. That is, the valve control unit 82 causes the first opening 60a and the second opening 60b of the switching valve 60 to communicate with each other.

As shown in FIG. 5E, the relief valve 54 is closed at time T3. In this state, the oil circulates in the normal circuit. Thus, the temperature of the oil continues to rise as shown in FIG. 5B. At time T4, the temperature of the oil reaches the normal operation lower limit temperature. As shown in FIG. 5A, at this timing, the pump control unit 80 operates the first pump 38, the second pump 46, and the third pump 62 in the normal rotational speed range higher than the low rotational speed range. Thus, the normal operation is started.

6. Others

The lubrication system 30 may include an electric motor instead of the gas turbine engine 22.

7. Effects of Present Embodiment

In the present embodiment, the connection destination of the intake opening 62i of the one or more third pumps 62 is selectively switched to either the generator 24 or the tank 36. According to the present embodiment, the one or more third pumps 62 can be used not only as a pump for recovering oil from the generator 24, but also as a pump dedicated to heating oil. According to the present embodiment, the temperature of the oil can be quickly raised by switching the switching valve 60 in accordance with the flow state of the oil. Thus, oil is likely to flow at an early stage, and thus oil can be smoothly supplied to the target object to be lubricated by the oil.

8. Supplementary Note

In relation to the above-described disclosure, the following supplementary notes are further disclosed.

Supplementary Note 1

The lubrication system (30) according to the present disclosure including: the first pump (38) configured to draw oil from the tank (36) and supply the oil to the lubrication target (24) to be lubricated by the oil; the second pump (46) configured to draw the oil from the lubrication target and discharge the oil to the tank; the relief valve (54) configured to release the oil to the tank from the first flow path (42) located between the first pump and the lubrication target via the second flow path (58) different from the first flow path in the case that a pressure value of the oil in the first flow path becomes equal to or higher than the predetermined value; the third pump (62) configured to discharge the oil drawn via the intake opening (62i) to the tank; the switching valve (60) configured to selectively switch the connection destination of the intake opening between the lubrication target and the tank; and the valve control unit (82) configured to control the switching valve to switch the connection destination of the intake opening of the third pump.

In the above configuration, the connection destination of the intake opening of the third pump can be selectively switched to either the lubrication target or the tank. According to the above configuration, the third pump can be used not only as a pump for recovering oil from the lubrication target, but also as a pump dedicated to heating of oil. According to such a configuration, the temperature of the oil can be quickly raised by switching the switching valve in accordance with the flow state of the oil. Thus, the oil is likely to flow at an early stage, and thus the oil can be smoothly supplied to the target object to be lubricated by the oil.

Supplementary Note 2

In the lubrication system according to Supplementary Note 1, the valve control unit may perform first control of the switching valve to connect the intake opening of the third pump to the tank while the oil is released from the first flow path to the tank via the relief valve and the second flow path.

Supplementary Note 3

In the lubrication system according to Supplementary Note 2, the valve control unit may switch control of the switching valve from the first control to second control to connect the intake opening of the third pump to the lubrication target in a case that the flow rate of the oil discharged from the lubrication target exceeds the flow rate of the oil drawable by the second pump.

Supplementary Note 4

The lubrication system according to any one of Supplementary Notes 1 to 3, further comprising: the pressure detection unit (72) configured to detect the pressure value of the oil in the first flow path; and the temperature detection unit (74) configured to detect a temperature of the oil in the first flow path, wherein the valve control unit may control the switching valve based on the pressure value detected by the pressure detection unit and the temperature detected by the temperature detection unit.

The flow rate of the oil depends on the temperature of the oil. Therefore, the control related to the flow rate of the oil can be performed by detecting the temperature of the oil instead of detecting the flow rate of the oil. Cost can be reduced by using a temperature sensing device instead of a flow rate sensing device.

Supplementary Note 5

In the lubrication system according to Supplementary Note 4, the valve control unit may control the switching valve to connect the intake opening of the third pump to the tank in the case that the pressure value detected by the pressure detection unit is equal to or higher than the predetermined value and the temperature detected by the temperature detection unit is equal to or lower than an upper limit temperature determined correspondingly to a rotational speed of the second pump.

Supplementary Note 6

In the lubrication system according to any one of Supplementary Notes 1 to 5, the first pump may be the feed pump (44), and the second pump and the third pump may be scavenging pumps (52).

According to the above configuration, since the plurality of pumps, that is, the second pump and the third pump, are made to function as scavenging pumps, it is not necessary to make each of the capacity of the second pump and the capacity of the third pump larger than the capacity of the first pump. Therefore, the first pump, the second pump, and the third pump can be configured by pumps of the same type. This makes it possible to reduce the manufacturing cost and the maintenance cost of the lubrication system.

Supplementary Note 7

In the lubrication system according to any one of Supplementary Notes 1 to 6, the first pump, the second pump, and the third pump may be driven by the common actuator.

According to the above configuration, the first pump, the second pump, and the third pump are driven by the common actuator, and thus the circuit can be made compact.

Supplementary Note 8

In the lubrication system according to Supplementary Note 7, the actuator may be the internal combustion engine (22).

Supplementary Note 9

In the lubrication system according to Supplementary Note 7, the actuator may be the electric motor.

Although concerning the present disclosure, a detailed description thereof has been presented above, the present disclosure is not necessarily limited to the individual embodiments described above. These embodiments may be subjected to various additions, substitutions, modifications, partial deletions and the like, within a range that does not deviate from the essence and gist of the present disclosure, or the spirit of the present disclosure as derived from the contents described in the claims and equivalents thereof. Further, the embodiments can also be implemented together in combination. For example, in the above-described embodiments, the order of each of the operations and the order of each of the processes are illustrated as examples, and the present invention is not necessarily limited to these features. The same also applies to cases in which numerical values or mathematical expressions are used in the description of the aforementioned embodiments.

The invention claimed is:

1. A lubrication system comprising:
a first pump configured to draw oil from a tank and supply the oil to a lubrication target to be lubricated by the oil;
a second pump configured to draw the oil from the lubrication target and discharge the oil to the tank;

a relief valve configured to release the oil to the tank from a first flow path located between the first pump and the lubrication target via a second flow path different from the first flow path in a case that a pressure value of the oil in the first flow path becomes equal to or higher than a predetermined value;
a third pump configured to discharge the oil drawn via an intake opening to the tank;
a switching valve configured to selectively switch a connection destination of the intake opening between the lubrication target and the tank; and
a valve control unit configured to control the switching valve to switch the connection destination of the intake opening of the third pump; wherein the valve control unit performs first control of the switching valve to connect the intake opening of the third pump to the tank while the oil is released from the first flow path to the tank via the relief valve and the second flow path.

2. The lubrication system according to claim 1, wherein the valve control unit switches control of the switching valve from the first control to second control to connect the intake opening of the third pump to the lubrication target in a case that a flow rate of the oil discharged from the lubrication target exceeds a flow rate of the oil drawable by the second pump.

3. The lubrication system according to claim 1, further comprising:
a pressure detection unit configured to detect the pressure value of the oil in the first flow path; and
a temperature detection unit configured to detect a temperature of the oil in the first flow path,
wherein the valve control unit controls the switching valve based on the pressure value detected by the pressure detection unit and the temperature detected by the temperature detection unit.

4. The lubrication system according to claim 3, wherein the valve control unit controls the switching valve to connect the intake opening of the third pump to the tank in a case that the pressure value detected by the pressure detection unit is equal to or higher than the predetermined value and the temperature detected by the temperature detection unit is equal to or lower than an upper limit temperature determined correspondingly to a rotational speed of the second pump.

5. The lubrication system according to claim 1, wherein the first pump is a feed pump, and
the second pump and the third pump are scavenging pumps.

6. The lubrication system according to claim 1, wherein the first pump, the second pump, and the third pump are driven by a common actuator.

7. The lubrication system according to claim 6, wherein the actuator is an internal combustion engine.

8. The lubrication system according to claim 6, wherein the actuator is an electric motor.

* * * * *